(12) United States Patent
Rickey et al.

(10) Patent No.: US 10,969,107 B2
(45) Date of Patent: Apr. 6, 2021

(54) TURBINE ENGINE ASSEMBLY INCLUDING A ROTATING DETONATION COMBUSTOR

(71) Applicant: General Electric Company, Schenectady, NY (US)

(72) Inventors: Owen James Sullivan Rickey, Saratoga Springs, NY (US); Venkat Eswarlu Tangirala, Niskayuna, NY (US); Narendra Digamber Joshi, Guilderland, NY (US); Shashank Yellapantula, Arvada, CO (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 385 days.

(21) Appl. No.: 15/705,954

(22) Filed: Sep. 15, 2017

(65) Prior Publication Data
US 2019/0086091 A1  Mar. 21, 2019

(51) Int. Cl.
| | | |
|---|---|---|
| *F23R 7/00* | (2006.01) | |
| *F02C 5/02* | (2006.01) | |
| *F23R 3/16* | (2006.01) | |
| *F23R 3/28* | (2006.01) | |
| *F23R 3/42* | (2006.01) | |

(52) U.S. Cl.
CPC .............. *F23R 7/00* (2013.01); *F02C 5/02* (2013.01); *F23R 3/16* (2013.01); *F23R 3/286* (2013.01); *F23R 3/425* (2013.01)

(58) Field of Classification Search
CPC .. F23R 3/16; F23R 3/425; F23R 3/286; F23R 7/00; F23R 3/56; F23R 3/28; F02C 5/04; F02C 6/18; F02C 7/22; F05D 2220/62
See application file for complete search history.

(56) References Cited

U.S. PATENT DOCUMENTS

| | | |
|---|---|---|
| 45,396 A | 12/1864 | Doerksen |
| 2,774,629 A | 12/1956 | Noon et al. |
| (Continued) | | |

FOREIGN PATENT DOCUMENTS

| | | | |
|---|---|---|---|
| CN | 102588145 A | * 7/2012 | ............... F02K 7/10 |
| CN | 105736178 A | 7/2016 | |
| | (Continued) | | |

OTHER PUBLICATIONS

U.S. Appl. No. 15/390,024, filed Dec. 23, 2016.
U.S. Appl. No. 15/390,120, filed Dec. 23, 2016.

*Primary Examiner* — Ted Kim
(74) *Attorney, Agent, or Firm* — Michele V. Frank; Edward A. Kmett; Venable LLP

(57) ABSTRACT

A rotating detonation combustor includes a combustion chamber configured for a rotating detonation process to produce a flow of combustion gas and an air plenum configured to contain a volume of air. The rotating detonation combustor also includes a flow passage coupled in flow communication between the combustion chamber and the air plenum and configured to channel an airflow from the air plenum. The rotating detonation combustor also includes a fuel inlet coupled in flow communication with the flow passage and configured to channel a fuel flow into the flow passage. The flow passage includes a plurality of fuel mixing mechanisms configured to mix the airflow and the fuel flow within the combustion chamber.

11 Claims, 13 Drawing Sheets

(56) References Cited

U.S. PATENT DOCUMENTS

| | | | |
|---|---|---|---|
| 2,796,734 A * | 6/1957 | Bodine, Jr. | F02K 7/04 |
| | | | 60/39.77 |
| 2,807,931 A | 10/1957 | Bodine, Jr. | |
| 2,888,803 A | 6/1959 | Lemuel | |
| 2,936,577 A | 5/1960 | Amnens | |
| 3,588,298 A * | 6/1971 | Edwards | F02C 5/10 |
| | | | 431/1 |
| 3,646,761 A | 3/1972 | Norman et al. | |
| 3,777,488 A | 12/1973 | Gross et al. | |
| 3,811,796 A | 5/1974 | Coleman et al. | |
| 3,879,937 A | 4/1975 | Jenny | |
| 3,958,899 A | 5/1976 | Coleman, Jr. et al. | |
| 4,397,613 A | 8/1983 | Keller | |
| 5,207,064 A * | 5/1993 | Ciokajlo | F23R 3/16 |
| | | | 60/737 |
| 5,800,153 A * | 9/1998 | DeRoche | F23C 15/00 |
| | | | 431/1 |
| 5,850,732 A * | 12/1998 | Willis | F23R 3/16 |
| | | | 60/804 |
| 6,494,034 B2 | 12/2002 | Kaemming et al. | |
| 6,526,936 B2 | 3/2003 | Nalim | |
| 6,584,764 B2 | 7/2003 | Baker | |
| 6,584,765 B1 * | 7/2003 | Tew | B64G 1/401 |
| | | | 60/247 |
| 6,668,542 B2 | 12/2003 | Baker et al. | |
| 6,758,032 B2 | 7/2004 | Hunter et al. | |
| 7,614,211 B2 | 11/2009 | Chapin et al. | |
| 7,669,406 B2 | 3/2010 | Tangirala et al. | |
| 7,784,267 B2 | 8/2010 | Tobita et al. | |
| 8,082,728 B2 | 12/2011 | Murrow et al. | |
| 8,146,371 B2 | 4/2012 | Nordeen | |
| 8,438,833 B2 | 5/2013 | Tangirala et al. | |
| 8,443,583 B2 | 5/2013 | Razi et al. | |
| 8,544,280 B2 | 10/2013 | Lu et al. | |
| RE45,396 E | 3/2015 | Muller et al. | |
| 9,027,324 B2 | 5/2015 | Snyder | |
| 9,046,058 B2 | 6/2015 | Claflin | |
| 9,512,805 B2 | 12/2016 | Snyder et al. | |
| 9,556,794 B2 | 1/2017 | François et al. | |
| 2009/0266047 A1 * | 10/2009 | Kenyon | F02C 5/02 |
| | | | 60/39.76 |
| 2011/0126511 A1 * | 6/2011 | Glaser | F02C 5/00 |
| | | | 60/248 |
| 2011/0146232 A1 | 6/2011 | Westervelt et al. | |
| 2013/0263569 A1 | 10/2013 | Guinan et al. | |
| 2014/0109588 A1 * | 4/2014 | Ciani | F23R 3/286 |
| | | | 60/776 |
| 2014/0182295 A1 | 7/2014 | François | |
| 2014/0196460 A1 * | 7/2014 | Falempin | F02K 7/08 |
| | | | 60/767 |
| 2015/0167544 A1 * | 6/2015 | Joshi | F23R 7/00 |
| | | | 123/205 |
| 2015/0308348 A1 | 10/2015 | Minick | |
| 2015/0323184 A1 | 11/2015 | Tangirala et al. | |
| 2015/0323185 A1 | 11/2015 | Silkowski et al. | |
| 2016/0290143 A1 | 10/2016 | Da Costa et al. | |
| 2017/0108224 A1 * | 4/2017 | Beck | F23R 3/36 |
| 2017/0146244 A1 * | 5/2017 | Kurosaka | F23R 7/00 |
| 2018/0355795 A1 * | 12/2018 | Pal | F23R 3/286 |

FOREIGN PATENT DOCUMENTS

| | | |
|---|---|---|
| CN | 106285945 A | 1/2017 |
| WO | 2012142485 A2 | 10/2012 |
| WO | 2014178746 A1 | 11/2014 |
| WO | 2016060581 A1 | 4/2016 |

* cited by examiner

TURBINE ENGINE ASSEMBLY INCLUDING A ROTATING DETONATION COMBUSTOR

BACKGROUND

The present disclosure relates generally to rotating detonation combustion systems and, more specifically, to rotating detonation combustion systems that provide increased mixing of fuel and air to more efficiently combust the fuel within the rotating detonation combustor.

In rotating detonation engines and, more specifically, in rotating detonation combustors, a mixture of fuel and an oxidizer is ignited such that combustion products are formed. For example, the combustion process begins when the fuel-oxidizer mixture in a tube or a pipe structure is ignited via a spark or another suitable ignition source to generate a compression wave. The compression wave is followed by a chemical reaction that transitions the compression wave to a detonation wave. The detonation wave enters a combustion chamber of the rotating detonation combustor and travels along the combustion chamber. Air and fuel are fed into the rotating detonation combustion chamber and are consumed by the detonation wave. As the detonation wave consumes air and fuel, combustion products traveling along the combustion chamber accelerate and are discharged from the combustion chamber.

In at least some known gas turbines including a can-annular combustor arrangement, fuel and air are channeled to the combustion chamber from at least one inlet. More specifically, at least some known fuel and air inlets discharge fluid across a flat surface into the combustion chamber. As such, the fuel and air may not completely intermix before combustion occurs, which may result in less than ideal turbine operating efficiencies.

Additionally, in at least some known rotating detonation combustion systems, forces from the detonation wave passing over the air and fuel inlets may expel hot combustion gases through either or both of the air and fuel inlets and into the associated air and fuel plenums. Inhalation of combustion gases into either the air or fuel plenums is undesirable as it may cause operating inefficiencies and/or a decrease in the service lifetime of the combustor.

BRIEF DESCRIPTION

In one aspect, a rotating detonation combustor is provided. The rotating detonation combustor includes a combustion chamber configured for a rotating detonation process to produce a flow of combustion gas and an air plenum configured to contain a volume of air. The rotating detonation combustor also includes a flow passage coupled in flow communication between the combustion chamber and the air plenum and configured to channel an airflow from the air plenum. The rotating detonation combustor also includes at least one fuel inlet coupled in flow communication with the flow passage and configured to channel a fuel flow into the flow passage. The flow passage includes a plurality of fuel mixing mechanisms configured to mix the airflow and the fuel flow within the combustion chamber.

In another aspect, a rotating detonation combustor is provided. The rotating detonation chamber includes a combustion chamber configured for a rotating detonation process to produce a flow of combustion gas and an air plenum configured to contain a volume of air. The rotating detonation chamber also includes a first sidewall and a second sidewall that define a flow passage therebetween such that the flow passage is coupled in flow communication between the combustion chamber and the air plenum and is configured to channel an airflow from the air plenum. The rotating detonation chamber further includes an air flow splitter positioned within the flow passage between the first sidewall and the second sidewall and a plurality of fuel mixing mechanisms coupled to at least one of the splitter and the first and second sidewalls A plurality of fuel inlets are coupled in flow communication with the flow passage and configured to channel a fuel flow into the flow passage, wherein the plurality of fuel mixing mechanisms are configured to mix the airflow and the fuel flow within the combustion chamber.

In yet another aspect, a turbine engine assembly is provided. The turbine engine assembly includes a plurality of rotating detonation combustors configured for a rotating detonation process to produce a flow of combustion gas and a turbine coupled downstream from the plurality of rotating detonation combustors and configured to receive the flow of combustion gas. Each rotating detonation combustor includes a combustion chamber, an air plenum configured to contain a volume of air, and a flow passage coupled in flow communication between the combustion chamber and the air plenum. The flow passage includes a plurality of fuel mixing mechanisms and is configured to channel an airflow from the air plenum. Each rotating detonation combustor also includes at least one fuel inlet coupled in flow communication with the flow passage and configured to channel a fuel flow into the flow passage. The plurality of fuel mixing mechanisms are configured to mix the airflow and the fuel flow within the combustion chamber.

DRAWINGS

These and other features, aspects, and advantages of the present disclosure will become better understood when the following detailed description is read with reference to the accompanying drawings in which like characters represent like parts throughout the drawings, wherein.

Figure 1:
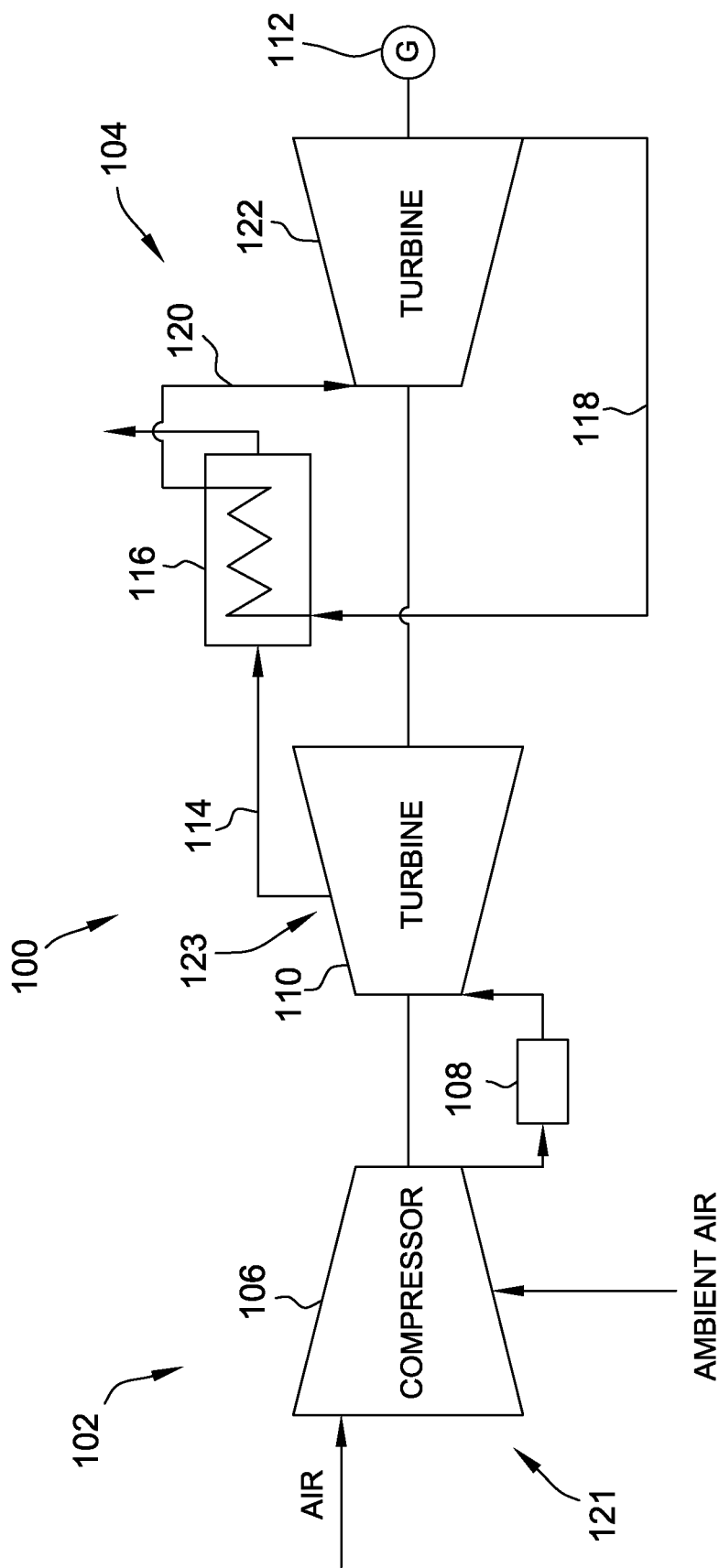
FIG. 1 is a schematic illustration of an exemplary combined cycle power generation system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine assembly or the rotating detonation combustor. Moreover, the terms "radial" and "radially" refer to directions and orientations that extend substantially perpendicular to the centerline of the turbine engine assembly or the rotating detonation combustor. In addition, as used herein, the terms "circumferential" and "circumferentially" refer to directions and orientations that extend arcuately about the centerline of the turbine engine assembly or the rotating detonation combustor. In addition, as used herein, the terms "tangential" and "tangentially" refer to directions and orientations that extend substantially perpendicular relative to a radial axis of the turbine engine assembly or the rotating detonation combustor.

Embodiments of the present disclosure relate to a turbine engine assembly that efficiently converts the energy of exhaust gas produced by detonative combustion into shaft mechanical work via a turbine. More specifically, the turbine engine assembly described herein includes a rotating detonation combustor that includes a combustion chamber, an air plenum, and a flow passage coupled in flow communication between the combustion chamber and the air plenum and configured to channel an airflow from the air plenum. A fuel inlet channels a fuel flow into the flow passage, and the flow passage includes a plurality of fuel mixing mechanisms configured to mix the airflow and the fuel flow within the combustion chamber. As described herein, the fuel mixing mechanisms include, but are not limited to, corrugations, dimples, protrusions, or obstructions.

The flow passage corrugations introduce a more complete and faster mixing of the fuel and air in the combustion chamber, resulting in a shorter mixing distance and stronger detonations. Furthermore, the shape of the air plenum in each RDC is designed such that the pressure wave created by the passing combustion wave reflects off an end wall and reaches the flow passage at the same time as the combustion wave comes back around. As such, the air plenum is designed to create an opposing pressure wave that stiffens the air within the flow passage to prevent the combustion wave from channeling fluid into air plenum and to push unburnt air back into the combustion chamber, resulting in a stronger combustion.

As used herein, "detonation" and "quasi-detonation" may be used interchangeably. Typical embodiments of detonation chambers include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out the detonation chamber exhaust to produce a thrust force. In addition, rotating detonation combustors are designed such that a substantially continuous detonation wave is produced and discharged therefrom. As known to those skilled in the art, detonation may be accomplished in a number of types of detonation chambers, including detonation tubes, shock tubes, resonating detonation cavities, and annular detonation chambers.

FIG. 1 is a schematic illustration of an exemplary combined cycle power generation system 100. Power generation system 100 includes a gas turbine engine assembly 102 and a steam turbine engine assembly 104. Gas turbine engine assembly 102 includes a compressor 106, a combustor 108, and a first turbine 110 powered by expanding hot gas produced in combustor 108 for driving an electrical generator 112. Gas turbine engine assembly 102 may be used in a stand-alone simple cycle configuration for power generation or mechanical drive applications. In the exemplary embodiment, exhaust gas 114 is channeled from first turbine 110 towards a heat recovery steam generator (HRSG) 116 for recovering waste heat from exhaust gas 114. More specifically, HRSG 116 transfers heat from exhaust gas 114 to water/steam 118 channeled through HRSG 116 to produce steam 120. Steam turbine engine assembly 104 includes a second turbine 122 that receives steam 120, which powers second turbine 122 for further driving electrical generator 112.

In operation, air enters gas turbine engine assembly 102 through an intake 121 and is channeled through multiple stages of compressor 106 towards combustor 108. Compressor 106 compresses the air and the highly compressed air is channeled from compressor 106 towards combustor 108 and mixed with fuel. The fuel-air mixture is combusted within combustor 108. High temperature combustion gas generated by combustor 108 is channeled towards first turbine 110. Exhaust gas 114 is subsequently discharged from first turbine 110 through an exhaust 123.

Figure 2:
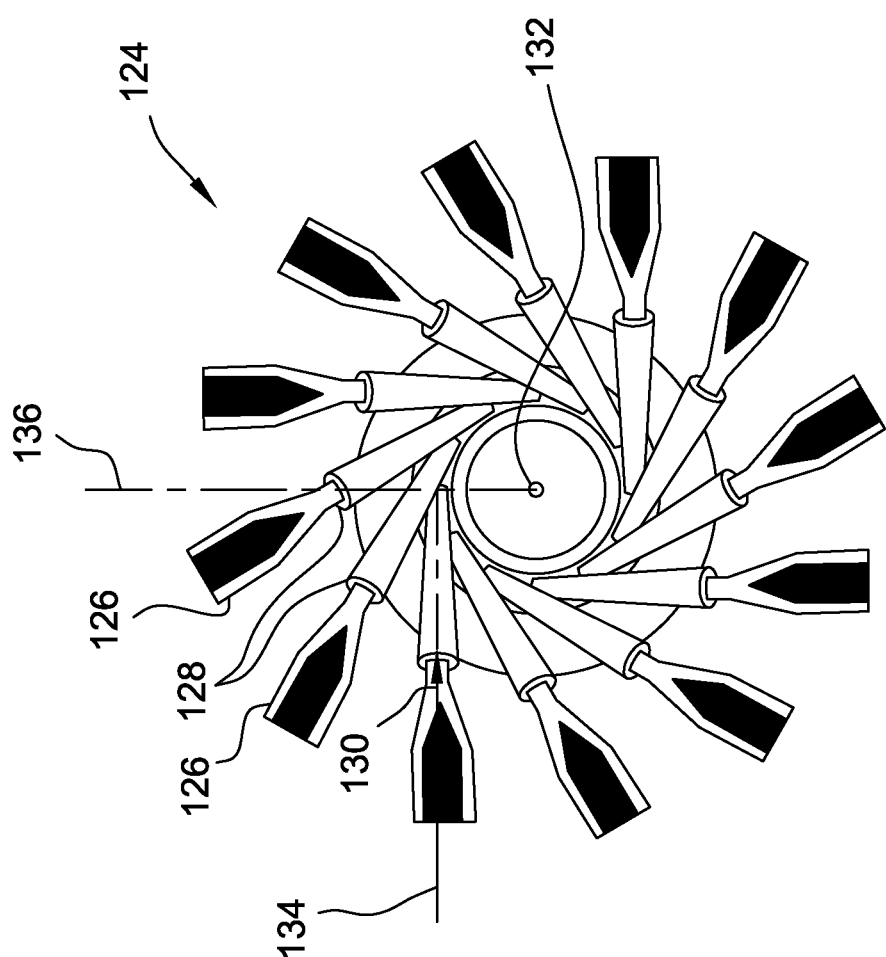
FIG. 2 is a schematic illustration of an exemplary rotating detonation combustion system that may be used in the combined cycle power generation system shown in FIG. 1.

FIG. 2 is a perspective illustration of an exemplary rotating detonation combustion (RDC) system 124 that may be used in combined cycle power generation system 100 (shown in FIG. 1). In the exemplary embodiment, RDC system 124 includes a plurality of rotating detonation combustors 126 and a plurality of flow conduits 128 coupled to the plurality of rotating detonation combustors 126. As described above, the plurality of rotating detonation combustors 126 combust a fuel-air mixture (not shown in FIG. 2) to produce a flow of combustion gas 130. The plurality of rotating detonation combustors 126 are oriented such that the flow of combustion gas 130 discharged therefrom flows in a partially circumferential direction relative to an axial centerline 132 of gas turbine engine assembly 102 (shown in FIG. 1). More specifically, each rotating detonation combustor 126 has a longitudinal centerline 134, and each rotating detonation combustor 126 is oriented such that longitudinal centerline 134 is oriented tangentially relative to a radial axis 136 of gas turbine engine assembly 102. As such, orienting rotating detonation combustors 126 with a circumferential or tangential component facilitates satisfying turbine inlet flow angle requirements for first turbine 110 (shown in FIG. 1) coupled downstream from the plurality of rotating detonation combustors 126. As used herein, "flow angle" is defined as a ratio of circumferential or tangential velocity to axial velocity of a flow of fluid.

In alternative embodiments, rotating detonation combustors 126 may be oriented at other angles relative to the radial axis 136. For example, the angle defined between longitudinal centerline 134 and radial axis 136 is defined within a range between about 0 degrees and about 180 degrees, between about 30 degrees and about 150 degrees, between about 60 degrees and about 120 degrees, between about 60 degrees and about 90 degrees, or between about 75 degrees and about 90 degrees.

Figure 3:
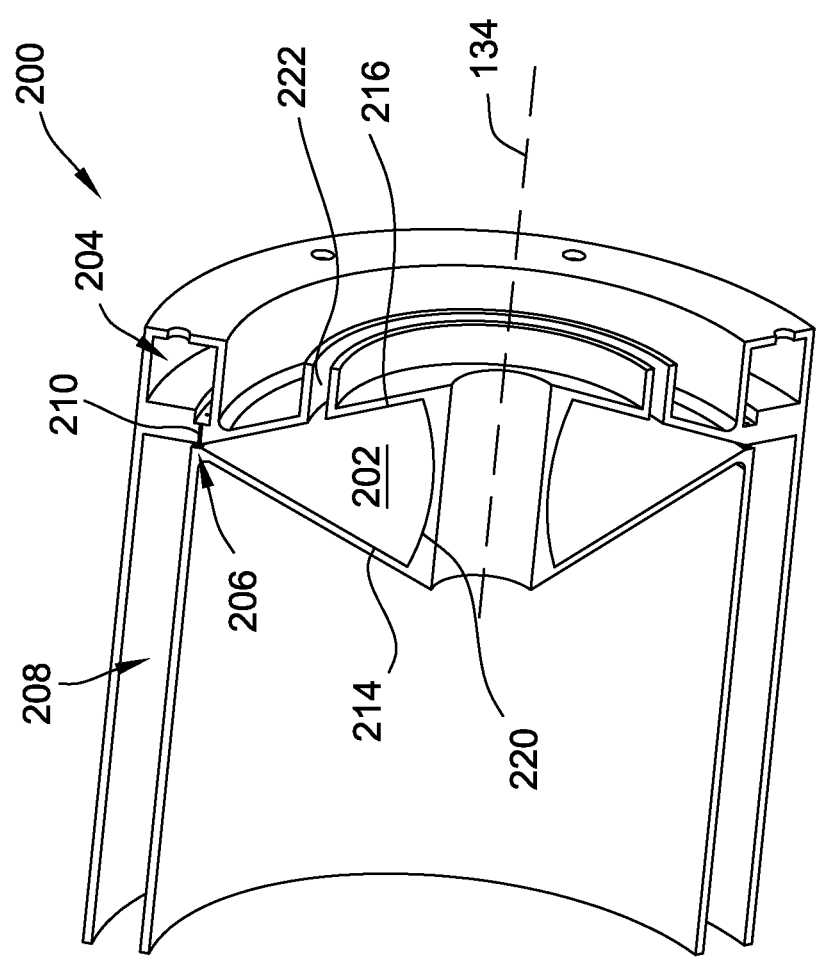
FIG. 3 is a schematic cross-sectional illustration of an exemplary rotating detonation combustor that may be used in the rotating detonation combustion system shown in FIG. 2.
Figure 4:
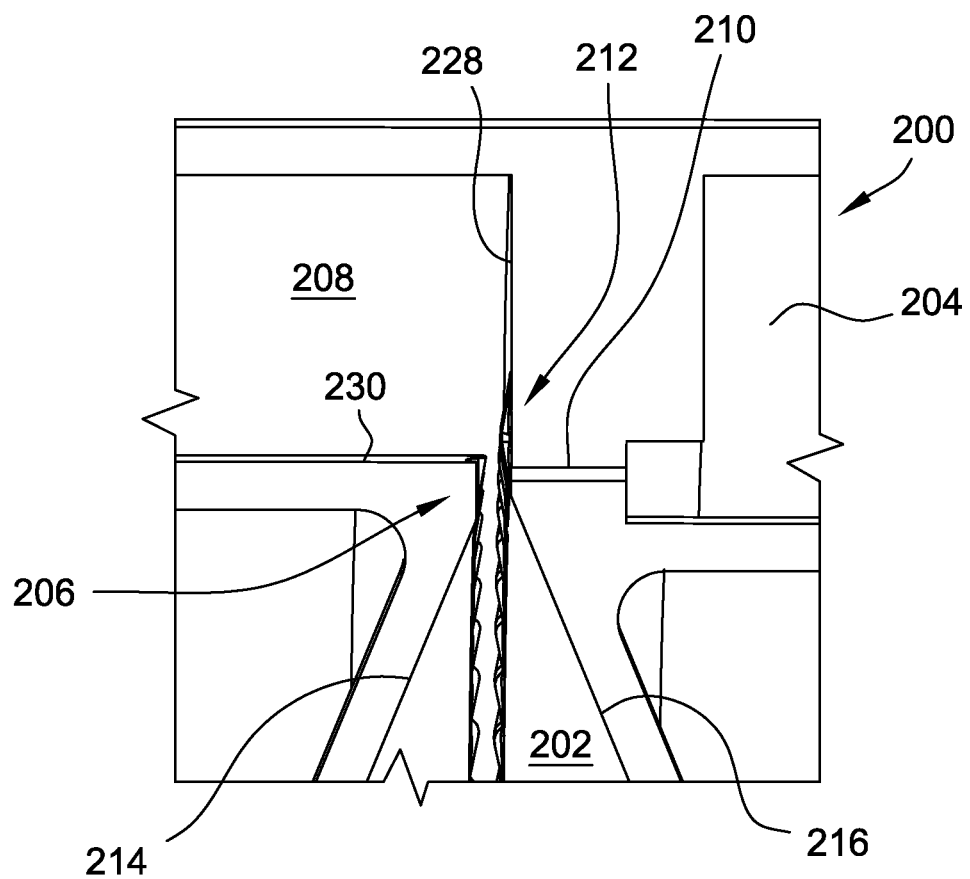
FIG. 4 is an enlarged illustration of the rotating detonation combustor shown in FIG. 3.
Figure 5:
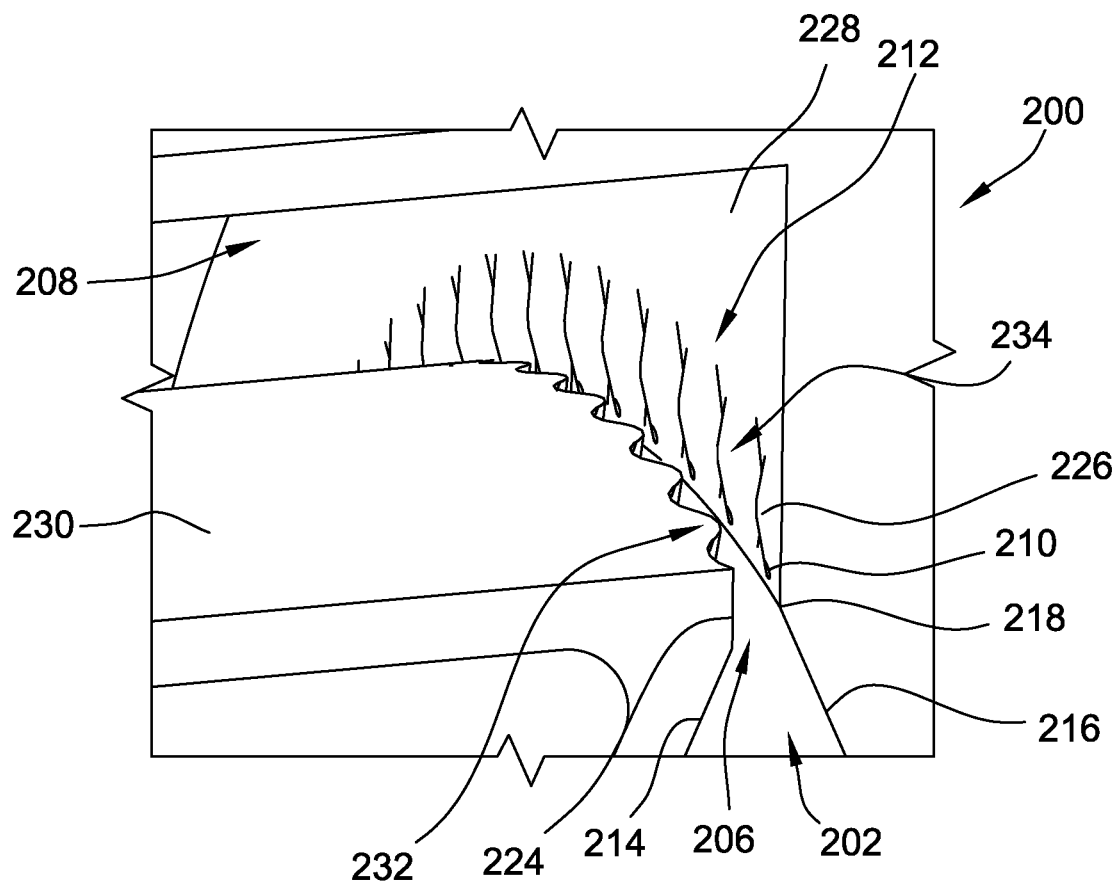
FIG. 5 is another enlarged illustration of the rotating detonation combustor shown in FIG. 3.

FIG. 3 is a cross-sectional schematic illustration of an exemplary rotating detonation combustor (RDC) 200 that may be used in RDC system 124 (shown in FIG. 2). FIG. 4 is an enlarged illustration of RDC 200, and FIG. 5 is another enlarged illustration of RDC 200. Rotating detonation combustor 200 is one example of rotating detonation combustor 126 (shown in FIG. 2) that may be used in RDC system 124. In the exemplary embodiment, RDC 200 includes an air plenum 202 that contains a volume of air and a fuel plenum 204 that contains a volume of fuel. A flow passage 206 couples air plenum 202 and fuel plenum 204 in flow communication with a combustion chamber 208 of RDC 200. Specifically, flow passage 206 is coupled in flow communication between air plenum 202 and combustion chamber 208 and channels an airflow from air plenum 202 toward combustion chamber 208. In the exemplary embodiment, air plenum 202 is oriented perpendicular to combustion chamber 208 and flow passage 206 is oriented perpendicular to centerline axis 134. Alternatively, air plenum 202 is axially aligned with combustion chamber 208 and flow passage 206 is oriented parallel with centerline axis 134.

Additionally, RDC 200 includes a fuel inlet 210 that couples fuel plenum 204 in flow communication with flow passage 206 and channels a fuel flow into flow passage 206. As described in further detail below, in the exemplary embodiment, flow passage 206 includes a plurality of fuel mixing mechanisms 212 over which the airflow and fuel flow are channeled. Fuel mixing mechanisms 212 cause the air from air plenum 202 and the fuel from fuel inlet 210 to mix within combustion chamber 208. In the exemplary embodiment, and in subsequently described embodiments, fuel mixing mechanisms 212 include, but are not limited to, corrugations, dimples, protrusions, or obstructions. Generally, fuel mixing mechanisms 212 include any mechanism that facilities mixing of air and fuel to enable operation of the rotating detonation combustors described herein. For simplicity, the fuel mixing mechanisms are shown in the figures and described hereafter as corrugations. Although only shown and described hereafter as corrugations, the fuel mixing mechanisms are not limited embodying only corrugations and may include any type of fuel mixing mechanism.

As shown in FIGS. 3-5, air plenum 202 includes a first sidewall 214 and a second sidewall 216 that converge to form a throat portion 218 at an inlet of flow passage 206 between air plenum 202 and flow passage 206. Furthermore, air plenum 202 includes an end wall 220 coupled between sidewalls 214 and 216 opposite throat portion 218. In the exemplary embodiment, end wall 220 is curved for the entire arc length between sidewalls 214 and 216. In another embodiment, end wall 220 is substantially flat or planar for at least a partial distance between sidewalls 214 and 216. Air plenum 202 also includes an air inlet 222 that channels air into air plenum 202. In the exemplary embodiment, air inlet 222 is oriented parallel to centerline axis 134 and is defined in second sidewall 216. In other embodiments, air inlet 222 is oriented perpendicular to centerline axis 134 and is defined in end wall 220.

Referring now to FIG. 5, flow passage 206 includes a first sidewall 224 and an opposing second sidewall 226 that define flow passage 206 therebetween. In the exemplary embodiment, fuel inlet 210 is defined through second sidewall 226 and is positioned downstream, with respect to fluid flow through RDC 200, of throat portion 218. Additionally, second sidewall 226 is a portion of a wall 228 of combustion chamber 208 such that a portion of wall 228 at least partially defines flow passage 206. In the exemplary embodiment, combustion chamber 208 also includes a sidewall 330 that is oriented perpendicular to first and second sidewalls 224 and 226 of flow passage. Alternatively, as described in further detail below, second sidewall 226 is a portion of sidewall 230 such that a portion of sidewall 230 at least partially defines flow passage 206 and end wall 228 is oriented perpendicular to first and second sidewalls 224 and 226 of flow passage 206.

In the exemplary embodiment, corrugations 212 are positioned downstream from fuel inlet 210 in flow passage 206 and include a first subset of corrugations 232 formed in first sidewall 224 and a second subset of corrugations 234 formed in second sidewall 226. Alternatively, corrugations 212 are positioned upstream from fuel inlet 210 in flow passage 206. Generally, corrugations 212 are positioned at any location that facilitates operation of RDC 200 as described herein.

In operation, a combustion wave is traveling circumferentially around combustion chamber 208 and is continuously fed by the air and fuel being channeled from plenums 202 and 204 through flow passage 206. Corrugations 212 at the outlet of flow passage 208 introduce a more complete and faster mixing of the fuel and air in combustion chamber 208, resulting in a shorter mixing distance and stronger detonations within combustion chamber 208. Furthermore, corrugations 212 introduce both flow direction variation and flow velocity variation, which enhances the mixing of the fuel and air such that when the mixture exits flow passage 206 into combustion chamber 208, the flow is already partially mixed and corrugations 212 cause further turbulence in combustion chamber 208 to provide additional mixing.

When the combustion wave passes over a point in flow passage 206, it sends a pressure wave down into air plenum 202 through flow passage 206. In the exemplary embodiment, the shape of air plenum 202 is designed such that the pressure wave created by the passing combustion wave reflects off end wall 220 and reaches flow passage 206 at the same time as the combustion wave comes back around to the same point in flow passage 206. As such, air plenum 202 is designed to create an opposing pressure wave that stiffens the air within flow passage 206 to prevent the combustion wave from channeling fluid into air plenum. More specifically, air plenum 202 reflects the pressure wave and uses it to push unburnt air back into combustion chamber 208, resulting in a stronger combustion. In the exemplary embodiment, the length of end wall 220 includes any length that facilitates operation of RDC 200 as described herein. Additionally, in the exemplary embodiment, air inlet 222 is located approximately midway through air plenum 202 in the radial direction between end wall 220 and flow passage 206. As such, air inlet 222 is positioned to be in the anti-node of the pressure wave as it travels through air plenum 202.

Figure 6:
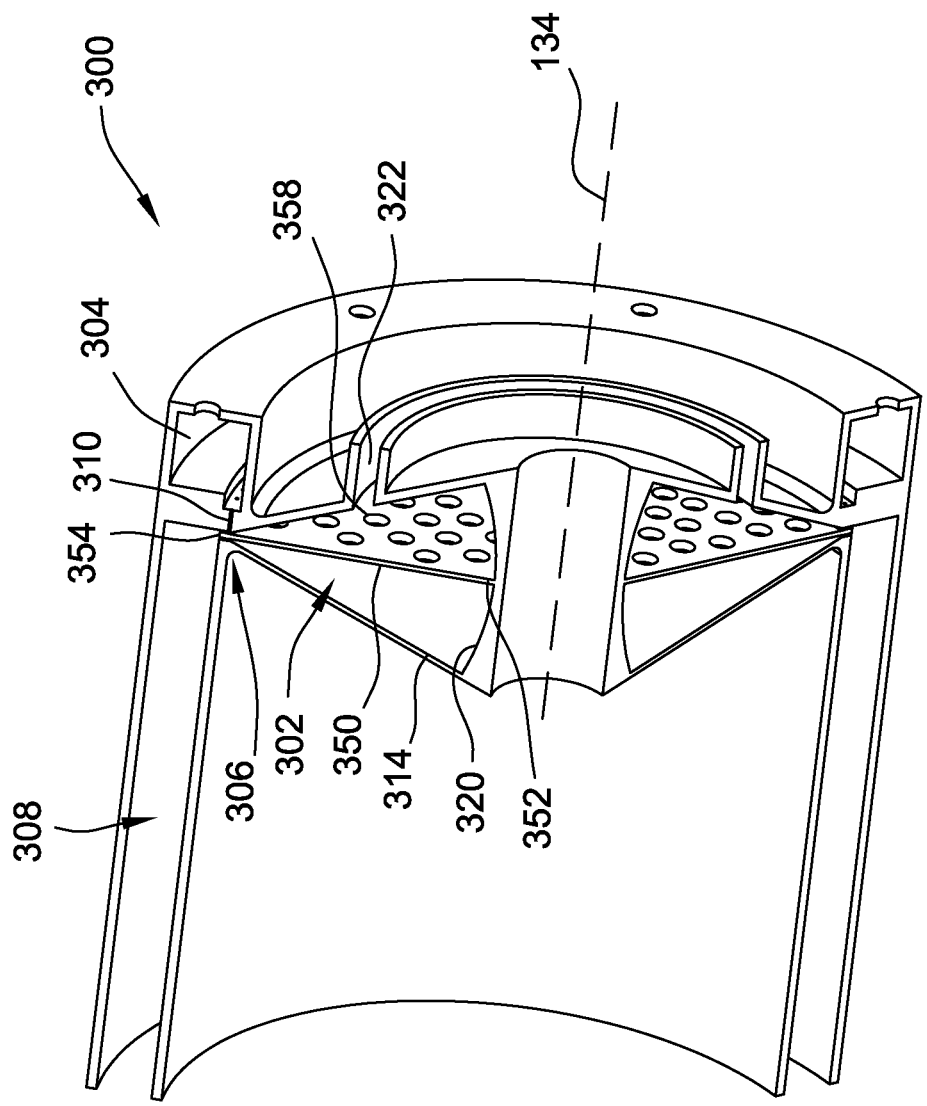
FIG. 6 is a schematic cross-sectional illustration of an alternative rotating detonation combustor that may be used in the rotating detonation combustion system shown in FIG. 2.
Figure 7:
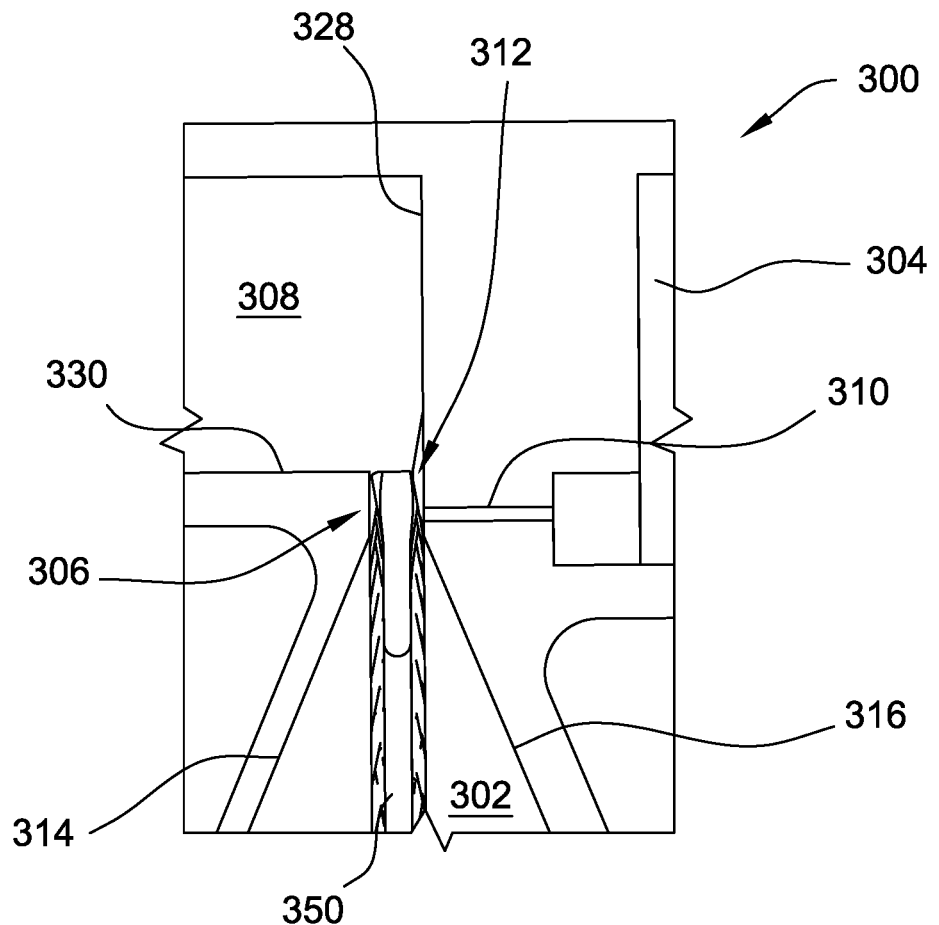
FIG. 7 is an enlarged illustration of the rotating detonation combustor shown in FIG. 6.
Figure 8:
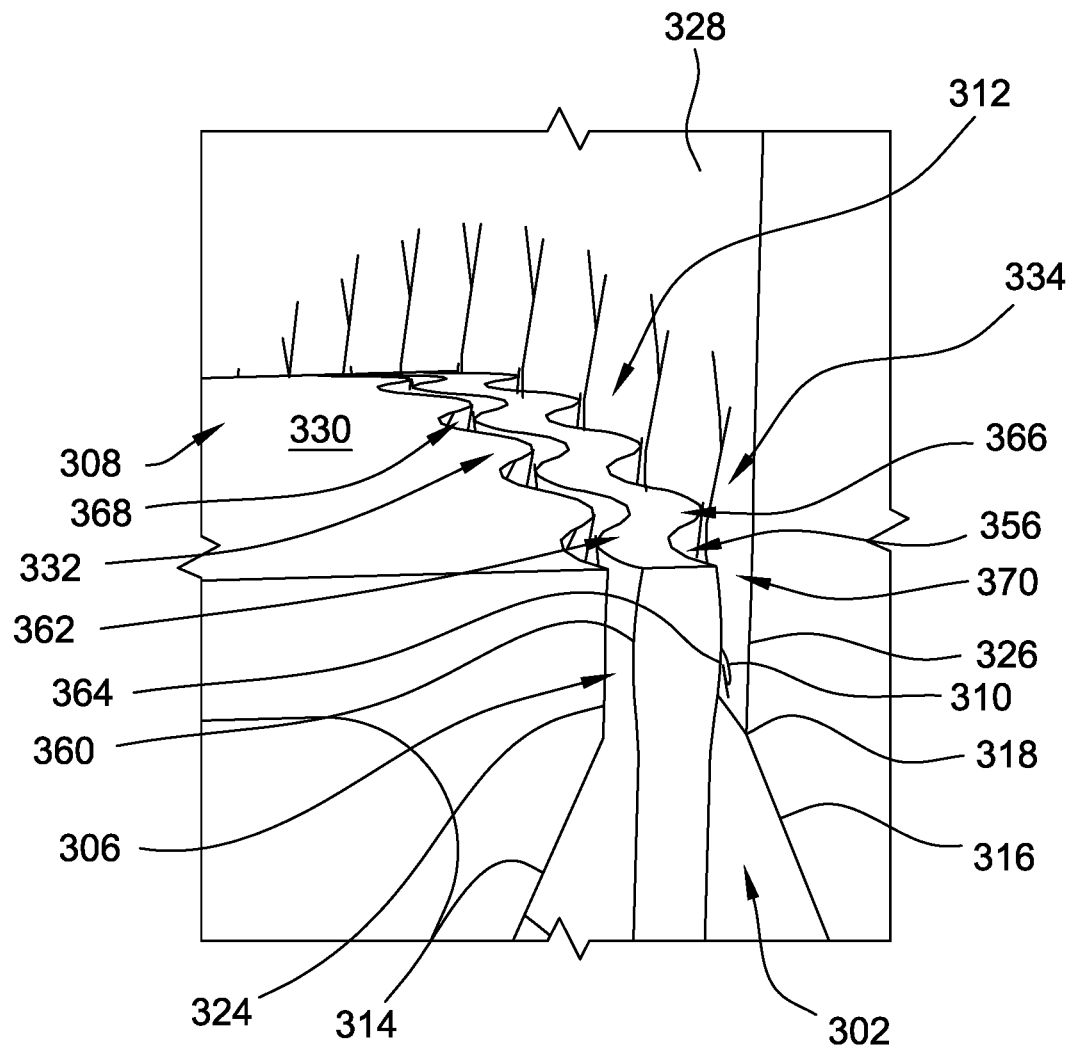
FIG. 8 is another enlarged illustration of the rotating detonation combustor shown in FIG. 6.

FIG. 6 is a schematic cross-sectional illustration of an alternative RDC 300 that may be used in the rotating detonation combustion system 124 (shown in FIG. 2). FIG. 7 is an enlarged illustration of RDC 300, and FIG. 8 is another enlarged illustration of RDC 300. RDC 300 is substantially similar to RDC 200 (shown in FIGS. 3-5) in operation and structure with the exception that RDC 300 includes a splitter 350 positioned in the flow passage between the air plenum and the combustion chamber. As such, components of RDC 300 shown in FIGS. 6-8 are labeled with similar reference numbers as those used to describe RDC 200 in FIGS. 3-5 with the exception that the reference numbers are in the 300 series. RDC 300 with splitter 350 may be substituted for RDC 200 without a splitter within rotating detonation combustion system 124.

As shown in FIGS. 6-8, splitter 350 is at least partially positioned in flow passage 306 and includes a first end 352 coupled to end wall 320 and a second end 354 positioned in flow passage 306 between sidewalls 324 and 326 of flow passage 306. Alternatively, first end 352 may be coupled to one or both of sidewalls 314 and 316 of air plenum 302. First end 352 of splitter 350 is substantially planar and second end 354 of splitter 350 includes a plurality of splitter corrugations 356 that facilitate mixing the airflow from air plenum 302 and the fuel flow from fuel inlet 310 within combustion chamber 308, as described herein. Furthermore, splitter 350 includes a plurality of openings 358 defined therethrough upstream of flow passage 306 and positioned within air plenum 302. Openings 358 enable airflow from air inlet 322 to flow through splitter 350 and fill air plenum 302.

As best shown in FIG. 8, splitter 350 includes a first sidewall 360 with a first subset 362 of corrugations 356. Similarly, splitter 350 includes a second sidewall 364 with a second subset 366 of corrugations 356. First subset 332 of flow passage corrugations 312 and first subset 362 of splitter corrugations 356 combine to form a first wave-shaped slot 368 through which a mixture of air and fuel is channeled and further mixed within combustion chamber 308. Similarly, second subset 334 of flow passage corrugations 312 and second subset 366 of splitter corrugations 356 combine to form a second wave-shaped slot 370 through which a mixture of air and fuel is channeled and further mixed within combustion chamber 308.

In operation, a combustion wave is traveling circumferentially around combustion chamber 308 and is continuously fed by the air and fuel being channeled from plenums 302 and 304 through flow passage 306. Flow passage corrugations 312 and splitter corrugations 356 at the outlet of flow passage 306 introduce a more complete and faster mixing of the fuel and air in combustion chamber 308, resulting in a shorter mixing distance and stronger detonations within combustion chamber 308. Furthermore, corrugations 312 and 356 introduce both flow direction variation and flow velocity variation, which enhances the mixing of the fuel and air such that when the mixture exits flow passage 306 into combustion chamber 308, the flow is already partially mixed and corrugations 312 cause further turbulence in combustion chamber 308 to provide additional mixing.

When the combustion wave passes over a point in flow passage 306, it sends a pressure wave down into air plenum 302 through flow passage 306. In the exemplary embodiment, the shape of air plenum 302 is designed such that the pressure wave created by the passing combustion wave reflects off end wall 320 and reaches flow passage 306 at the same time as the combustion wave comes back around to the same point in flow passage 306. As such, air plenum 302 is designed to create an opposing pressure wave that stiffens the air within flow passage 306 to prevent the combustion wave from channeling fluid into air plenum. More specifically, air plenum 302 reflects the pressure wave and uses it to push unburnt air back into combustion chamber 308, resulting in a stronger combustion. In the exemplary embodiment, the length of end wall 320 includes any length that facilitates operation of RDC 300 as described herein. Additionally, in the exemplary embodiment, air inlet 322 is located approximately midway through air plenum 302 in the radial direction between end wall 320 and flow passage 306. As such, air inlet 322 is positioned to be in the anti-node of the pressure wave as it travels through air plenum 302.

Figure 9:
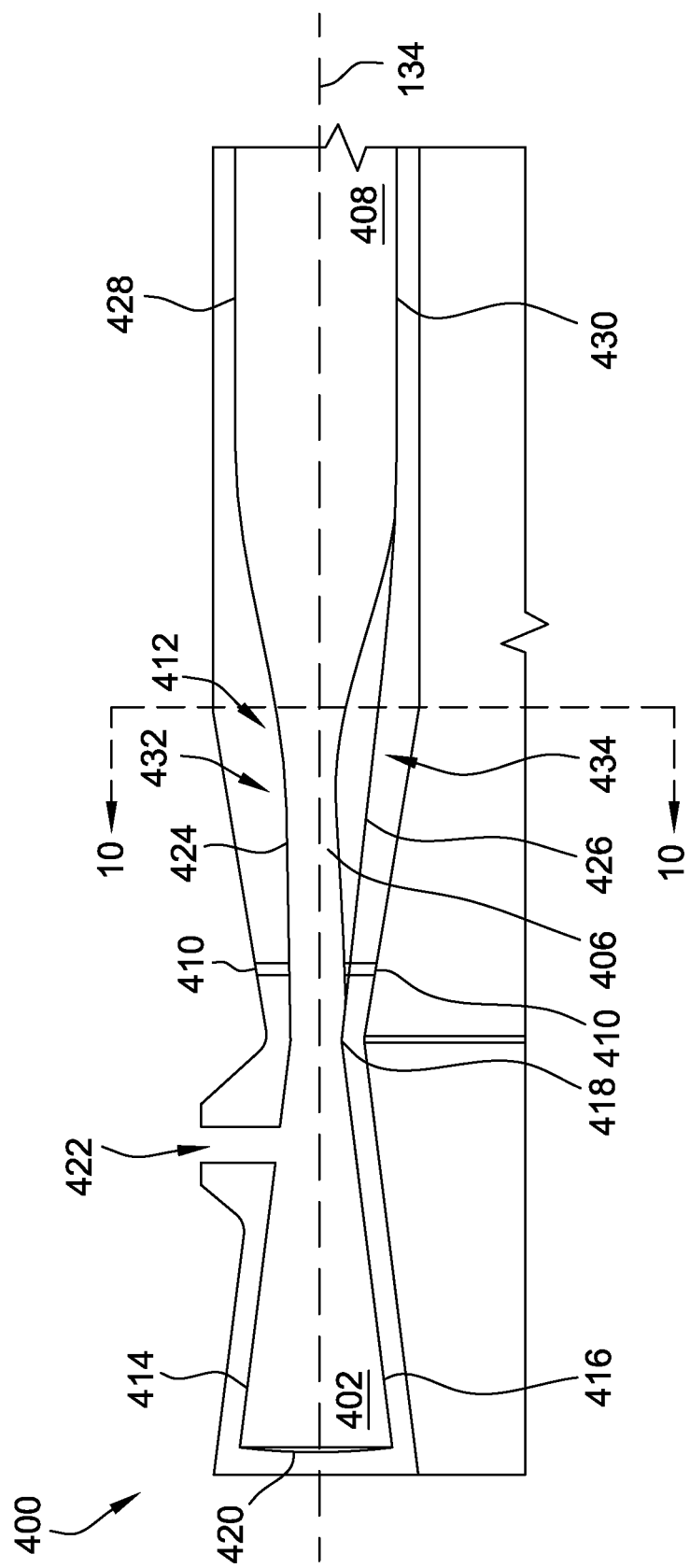
FIG. 9 is a schematic side cross-sectional illustration of another alternative rotating detonation combustor that may be used in the rotating detonation combustion system shown in FIG. 2.
Figure 10:
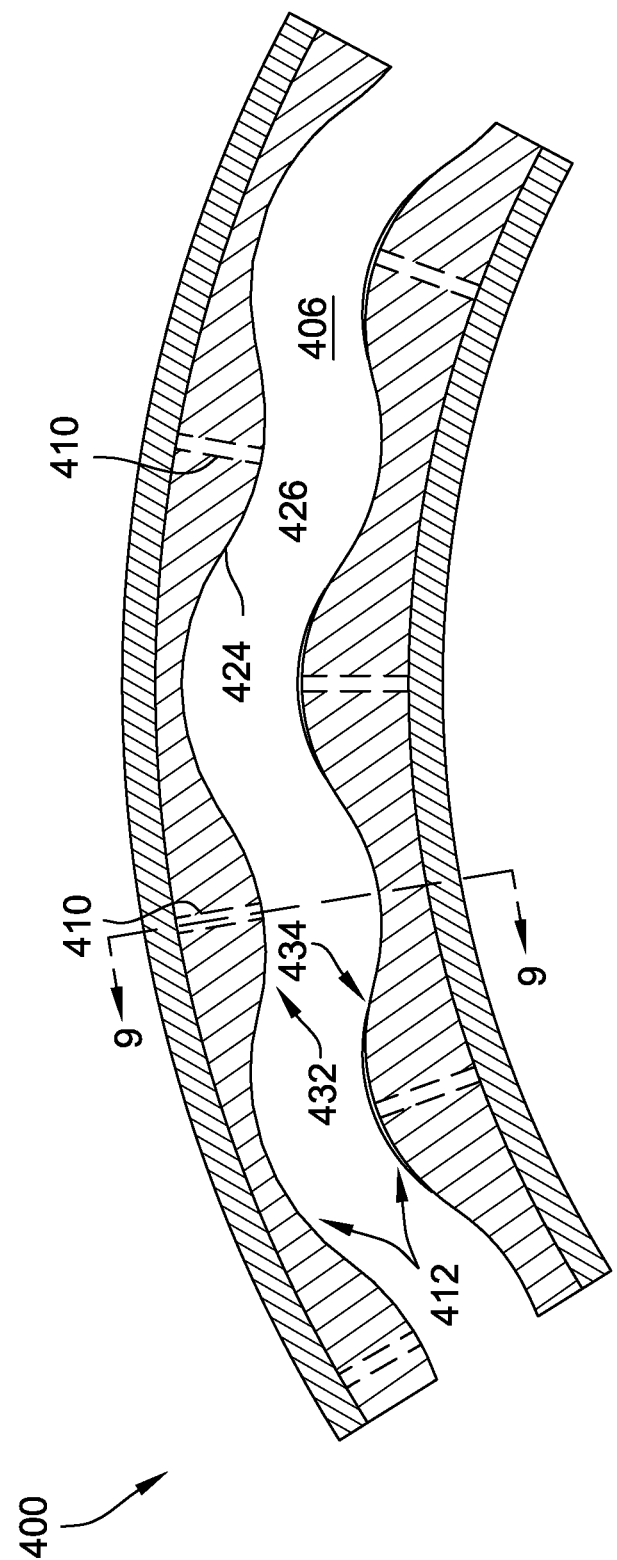
FIG. 10 is a schematic end cross-sectional illustration of the rotating detonation combustor shown in FIG. 9.

FIG. 9 is a schematic side cross-sectional illustration of another alternative RDC 400 that may be used in rotating detonation combustion system 124 (shown in FIG. 2), FIG. 10 is a schematic end cross-sectional illustration of RDC 400. RDC 400 is one example of rotating detonation combustor 126 (shown in FIG. 2) that may be used in RDC system 124. In the illustrated embodiment, RDC 400 includes an air plenum 402 that contains a volume of air and a fuel plenum (not shown) that contains a volume of fuel. A flow passage 406 couples air plenum 402 and fuel plenum in flow communication with a combustion chamber 408 of RDC 400. Specifically, flow passage 406 is coupled in flow communication between air plenum 402 and combustion chamber 408 and channels an airflow from air plenum 402 toward combustion chamber 408. In the illustrated embodiment, air plenum 402 is axially aligned with combustion chamber 408 and flow passage 406 is oriented parallel with centerline axis 134.

Additionally, RDC 400 includes at least one fuel inlet 410 that couples fuel plenum in flow communication with flow passage 406 and channels a fuel flow into flow passage 406. As described herein, flow passage 406 includes a plurality of corrugations 412 over which the airflow and fuel flow are channeled. Corrugations 412 cause the air from air plenum 402 and the fuel from fuel inlet 410 to mix within combustion chamber 408.

As shown in FIGS. 9 and 10, air plenum 402 includes a first sidewall 414 and a second sidewall 416 that converge to form a throat portion 418 at an inlet of flow passage 406 between air plenum 402 and flow passage 406. Furthermore, air plenum 402 includes an end wall 420 coupled between sidewalls 414 and 416 opposite throat portion 418. In the exemplary embodiment, end wall 420 is curved for the entire arc length between sidewalls 414 and 416. In another embodiment, end wall 420 is substantially flat or planar for at least a partial distance between sidewalls 414 and 416. Air plenum 402 also includes an air inlet 422 that channels air into air plenum 402. In the exemplary embodiment, air inlet 422 is oriented perpendicular to centerline axis 134 and is defined in first sidewall 414. In other embodiments, air inlet 422 is oriented parallel with centerline axis 134 and is defined in end wall 420.

Flow passage 406 includes a first sidewall 424 and an opposing second sidewall 426 that define flow passage 406 therebetween. In the illustrated embodiment, at least one fuel inlet 410 is defined through first sidewall 424 and is positioned downstream, with respect to fluid flow through RDC 400, of throat portion 418. Furthermore, at least one fuel inlet 410 is defined through second sidewall 426 and is also positioned downstream, with respect to fluid flow through RDC 400, of throat portion 418. Although RDC 400 is illustrated as having fuel inlets 410 defined through both sidewalls 424 and 426, it is contemplated that only one of sidewalls 424 or 426 includes fuel inlets 410. Additionally, first sidewall 424 is a portion of a first sidewall 428 of combustion chamber 408 such that a portion of sidewall 428 at least partially defines flow passage 406. Similarly, second sidewall 426 is a portion of a second sidewall 430 of combustion chamber 208 such that a portion of second sidewall 430 at least partially defines flow passage 406.

In the exemplary embodiment, corrugations 412 are positioned downstream from fuel inlet 410 in flow passage 406 and include a first subset of corrugations 432 formed in first sidewall 424 and a second subset of corrugations 434 formed in second sidewall 426. Alternatively, corrugations 412 are positioned upstream from fuel inlet 410 in flow passage 406. Generally, corrugations 412 are positioned at any location that facilitates operation of RDC 400 as described herein.

In operation, a combustion wave is traveling circumferentially around combustion chamber 408 and is continuously fed by the air and fuel being channeled from plenums 402 and 404 through flow passage 406. Corrugations 412 at the outlet of flow passage 406 introduce a more complete and faster mixing of the fuel and air in combustion chamber 408, resulting in a shorter mixing distance and stronger detonations within combustion chamber 408. Furthermore, corrugations 412 introduce both flow direction variation and flow velocity variation, which enhances the mixing of the fuel and air such that when the mixture exits flow passage 406 into combustion chamber 408, the flow is already partially mixed and corrugations 412 cause further turbulence in combustion chamber 408 to provide additional mixing.

When the combustion wave passes over a point in flow passage 406, it sends a pressure wave down into air plenum 402 through flow passage 406. In the exemplary embodiment, the shape of air plenum 402 is designed such that the pressure wave created by the passing combustion wave reflects off end wall 420 and reaches flow passage 406 at the same time as the combustion wave comes back around to the same point in flow passage 406. As such, air plenum 402 is designed to create an opposing pressure wave that stiffens the air within flow passage 406 to prevent the combustion wave from channeling fluid into air plenum. More specifically, air plenum 402 reflects the pressure wave and uses it to push unburnt air back into combustion chamber 408, resulting in a stronger combustion. In the exemplary embodiment, the length of end wall 420 includes any length that facilitates operation of RDC 400 as described herein.

Additionally, in the exemplary embodiment, air inlet 422 is located approximately midway through air plenum 402 in the axial direction between end wall 420 and flow passage 406. As such, air inlet 422 is positioned to be in the anti-node of the pressure wave as it travels through air plenum 402.

Figure 11:
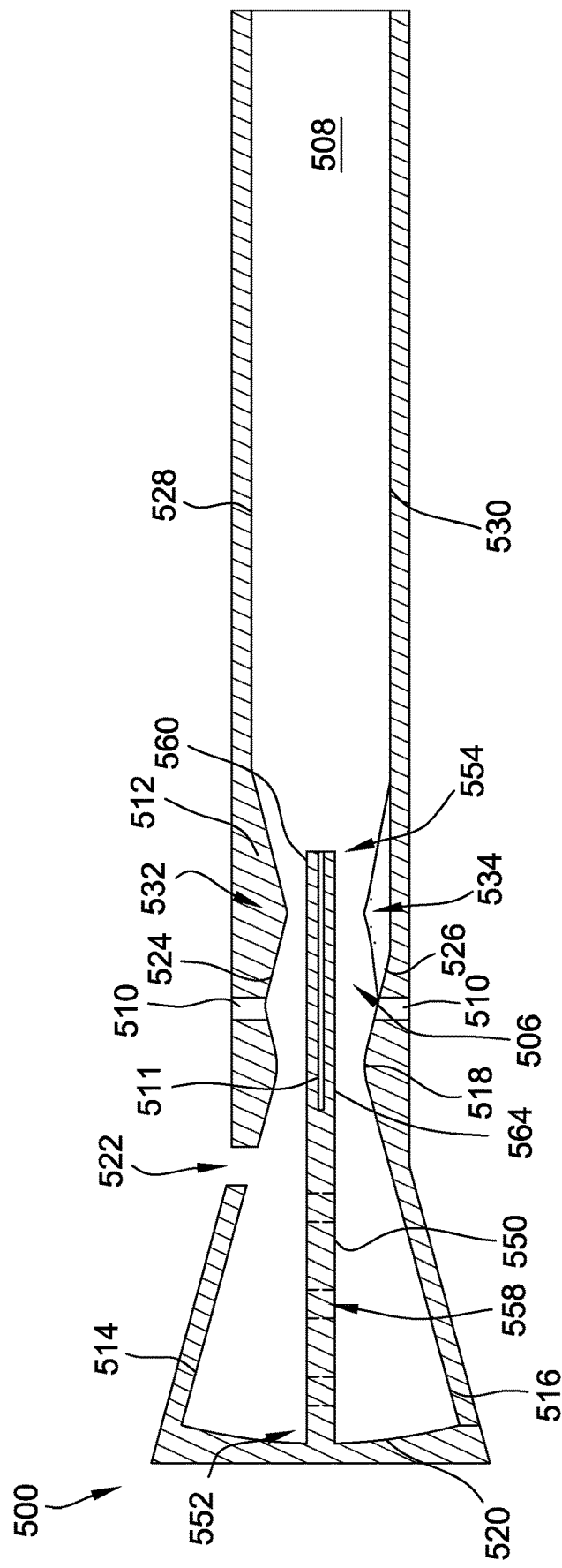
FIG. 11 is a side cross-sectional illustration of yet another alternative rotating detonation combustor that may be used in the rotating detonation combustion system shown in FIG. 2.
Figure 12:
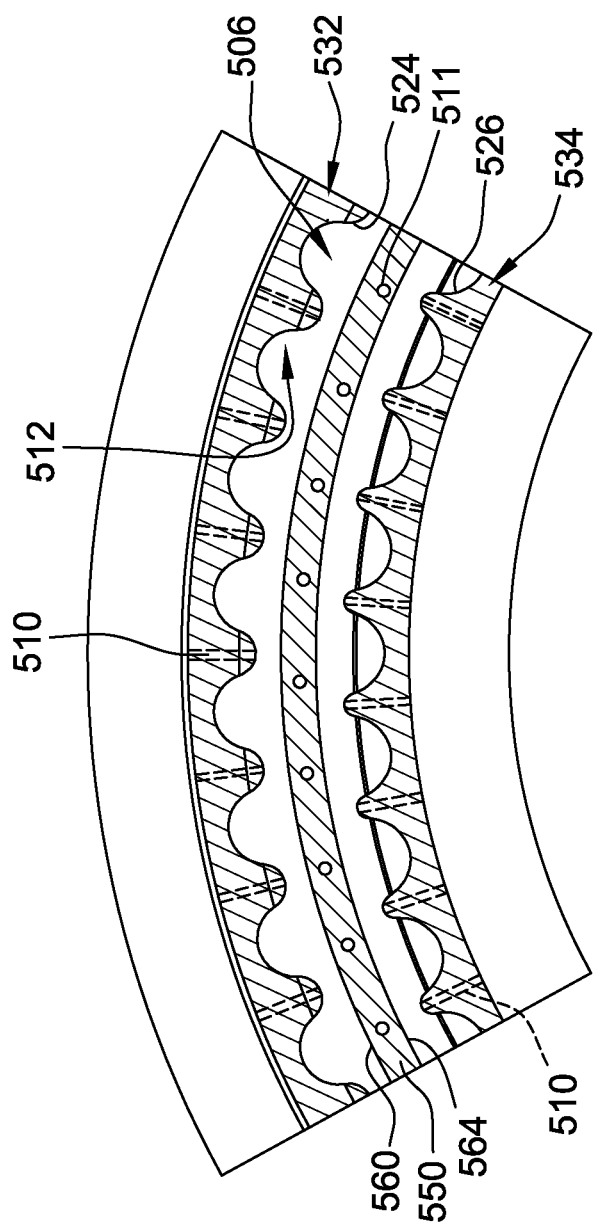
FIG. 12 is an end cross-sectional illustration of the rotating detonation combustor shown in FIG. 11.
Figure 13:
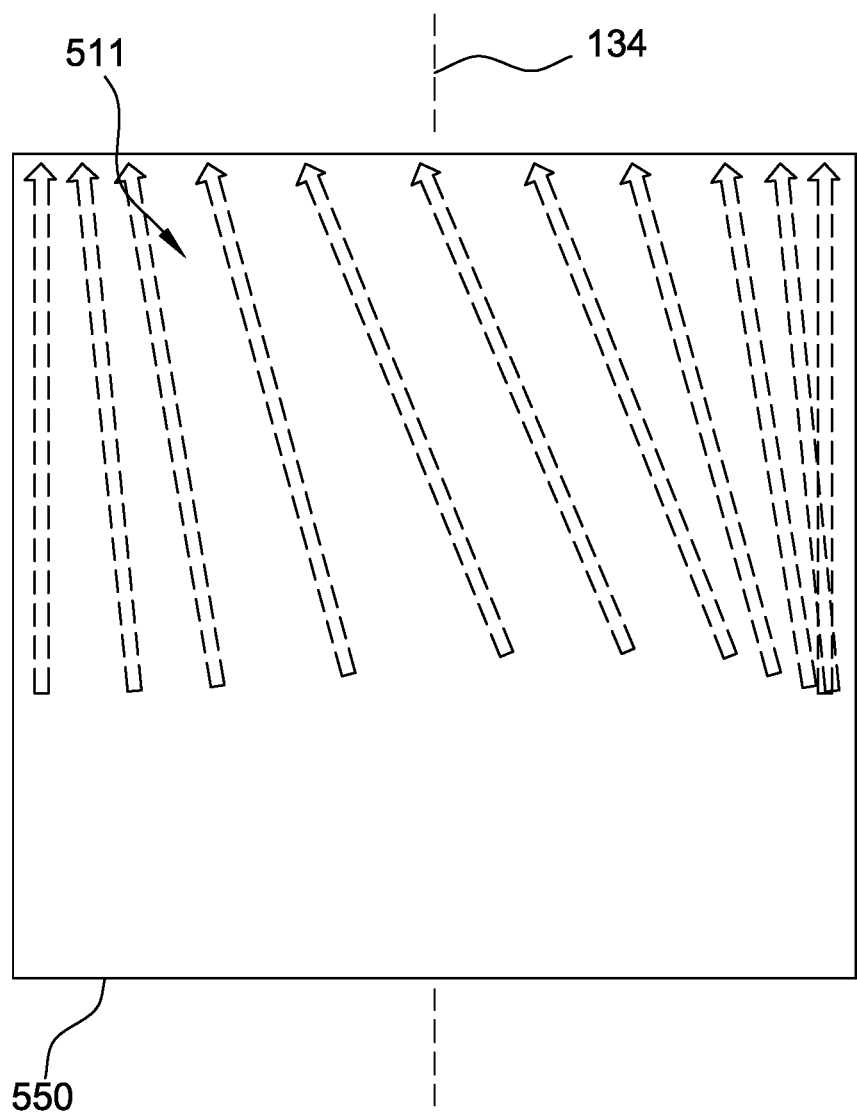
FIG. 13 is a top illustration of a portion of the rotating detonation combustor shown in FIG. 11.

FIG. 11 is a side cross-sectional illustration of another alternative RDC 500 that may be used in the rotating detonation combustion system 124 (shown in FIG. 2). FIG. 12 is an end cross-sectional illustration of RDC 500. FIG. 13 is a top illustration of a portion of RDC 500. In the illustrated embodiment, RDC 500 includes an air plenum 502 that contains a volume of air and a fuel plenum (not shown) that contains a volume of fuel. A flow passage 506 couples air plenum 502 and fuel plenum in flow communication with a combustion chamber 508 of RDC 500. Specifically, flow passage 506 is coupled in flow communication between air plenum 502 and combustion chamber 508 and channels an airflow from air plenum 502 toward combustion chamber 508. In the illustrated embodiment, air plenum 502 is axially aligned with combustion chamber 508 and flow passage 506 is oriented parallel with centerline axis 134.

Additionally, RDC 500 includes at least one fuel inlet 510 that couples fuel plenum in flow communication with flow passage 506 and channels a fuel flow into flow passage 506. As described herein, flow passage 506 includes a plurality of corrugations 512 over which the airflow and fuel flow are channeled. Corrugations 512 cause the air from air plenum 502 and the fuel from fuel inlet 510 to mix within combustion chamber 508.

As shown in FIGS. 11 and 12, air plenum 502 includes a first sidewall 514 and a second sidewall 516 that converge to form a throat portion 518 at an inlet of flow passage 506 between air plenum 502 and flow passage 506. Furthermore, air plenum 502 includes an end wall 520 coupled between sidewalls 514 and 516 opposite throat portion 518. In the exemplary embodiment, end wall 520 is curved for the entire arc length between sidewalls 514 and 516. In another embodiment, end wall 520 is substantially flat or planar for at least a partial distance between sidewalls 514 and 516. Air plenum 502 also includes an air inlet 522 that channels air into air plenum 502. In the exemplary embodiment, air inlet 522 is oriented perpendicular to centerline axis 134 and is defined in first sidewall 514. In other embodiments, air inlet 522 is oriented parallel with centerline axis 134 and is defined in end wall 520.

Flow passage 506 includes a first sidewall 524 and an opposing second sidewall 526 that define flow passage 506 therebetween. In the illustrated embodiment, at least one fuel inlet 510 is defined through first sidewall 524 and is positioned downstream, with respect to fluid flow through RDC 500, of throat portion 518. Furthermore, at least one fuel inlet 510 is defined through second sidewall 526 and is also positioned downstream, with respect to fluid flow through RDC 500, of throat portion 518. Although RDC 500 is illustrated as having fuel inlets 510 defined through both sidewalls 524 and 526, it is contemplated that only one of sidewalls 524 or 526 may include fuel inlets 510. Additionally, first sidewall 524 is a portion of a first sidewall 528 of combustion chamber 508 such that a portion of sidewall 528 at least partially defines flow passage 506. Similarly, second sidewall 526 is a portion of a second sidewall 530 of combustion chamber 508 such that a portion of second sidewall 530 at least partially defines flow passage 506.

In the exemplary embodiment, corrugations 512 are positioned downstream from fuel inlet 510 in flow passage 506 and include a first subset of corrugations 532 formed in first sidewall 524 and a second subset of corrugations 534 formed in second sidewall 526. Alternatively, corrugations 512 are positioned upstream from fuel inlet 410 in flow passage 506. Generally, corrugations 512 are positioned at any location that facilitates operation of RDC 500 as described herein.

RDC 500 also includes a splitter 550 positioned in the flow passage 506 between the air plenum 502 and the combustion chamber 508. As shown in FIGS. 11-13, splitter 550 is at least partially positioned in flow passage 506 and includes a first end 552 coupled to end wall 520 and a second end 554 positioned in flow passage 506 between sidewalls 524 and 526 of flow passage 506. Alternatively, first end 552 may be coupled to one or both of sidewalls 514 and 516 of air plenum 502. Furthermore, splitter 550 includes a plurality of openings 558 defined therethrough upstream of flow passage 506 and positioned within air plenum 502. Openings 558 enable airflow from air inlet 522 to flow through splitter 550 and fill air plenum 502.

Splitter 550 includes a first sidewall 560 and an opposing second sidewall 564 that is substantially parallel to first sidewall 560. More specifically, sidewalls 560 and 564 are parallel for an entirety of the length of splitter 550 between first end 552 and 554. Additionally, sidewalls 560 and 564 at second end 554 of splitter 550 are substantially planar, or smooth, such that splitter 550 does not include corrugations or other fuel mixing mechanism.

In the illustrated embodiment, fuel inlets 510 in first sidewall 524 are formed radially from the peaks of first subset 532 of corrugations 512. That is, fuel inlets 650 are formed in sidewall 524 at a point where the distance between sidewall 524 and sidewall 560 is shortest. Similarly, fuel inlets 510 in second sidewall 526 are formed radially from the peaks of second subset 534 of corrugations 512. That is, fuel inlets 510 are formed in sidewall 526 at a point where the distance between sidewall 526 and sidewall 564 is shortest. Locating fuel inlets 510 at such locations positions fuel inlets 510 at the point of lowest pressure within flow passage 506. And therefore protects the fuel from the combustion wave that travels around chamber 508.

In the illustrated embodiment, splitter 550 includes a plurality of fuel inlets 511 defined therein. More specifically, splitter fuel inlets 511 are located approximately midway between first sidewall 560 and second sidewall 564. In one embodiment, splitter fuel inlets 511 are used in combination with fuel inlets 510 to provide fuel in two different locations. In other embodiments, RDC 500 does not include fuel inlets 510, and splitter fuel inlets 511 provide all of the fuel necessary for combustion. Additionally, as shown in FIG. 13, at least one splitter fuel inlet 511 is obliquely oriented with respect to centerline 134 such that at least one splitter fuel inlet 511 discharges fuel at an angle relative to centerline 134. In the illustrated embodiment, the angle of orientation of splitter fuel inlets 511 changes around the circumference of splitter 550. Alternatively, each splitter fuel inlet 511 is oriented at the same angle relative to centerline 134 such that fuel is injected into combustion chamber 508 at the same angle relative to centerline 134 about the circumference of splitter 550. Injecting fuel into combustion chamber 508 at an angle relative to centerline 134 orients the fuel flow in the direction of the traveling combustion wave and also prevents or reduces the likelihood of the pressure wave traveling back down the splitter fuel inlets 511.

In operation, a combustion wave is traveling circumferentially around combustion chamber 508 and is continuously fed by the air and fuel being channeled from plenums 502 and 504 through flow passage 506. Corrugations 512 at the outlet of flow passage 508 introduce a more complete and faster mixing of the fuel and air in combustion chamber 508, resulting in a shorter mixing distance and stronger detonations within combustion chamber 508. Furthermore, corrugations 512 introduce both flow direction variation and flow velocity variation, which enhances the mixing of the fuel and air such that when the mixture exits flow passage 506 into combustion chamber 508, the flow is already partially mixed.

When the combustion wave passes over a point in flow passage 506, it sends a pressure wave down into air plenum 502 through flow passage 506. In the exemplary embodiment, the shape of air plenum 502 is designed such that the pressure wave created by the passing combustion wave reflects off end wall 520 and reaches flow passage 506 at the same time as the combustion wave comes back around to the same point in flow passage 506. As such, air plenum 502 is designed to create an opposing pressure wave that stiffens the air within flow passage 506 to prevent the combustion wave from channeling fluid into air plenum. More specifically, air plenum 502 reflects the pressure wave and uses it to push unburnt air back into combustion chamber 508, resulting in a stronger combustion. In the exemplary embodiment, the length of end wall 220 includes any length that facilitates operation of RDC 500 as described herein. Additionally, in the exemplary embodiment, air inlet 522 is located approximately midway through air plenum 502 in the radial direction between end wall 520 and flow passage 506. As such, air inlet 522 is positioned to be in the anti-node of the pressure wave as it travels through air plenum 502.

The systems and methods described herein facilitate efficiently converting the kinetic energy of high velocity RDC combustion products. More specifically, the RDC systems described herein include a plurality of rotating detonation combustors that each include a plurality of corrugations between and air plenum and the combustion chamber. The flow passage corrugations introduce a more complete and faster mixing of the fuel and air in the combustion chamber, resulting in a shorter mixing distance and stronger detonations. Furthermore, the shape of the air plenum in each RDC is designed such that the pressure wave created by the passing combustion wave reflects off an end wall and reaches the flow passage at the same time as the combustion wave comes back around. As such, the air plenum is designed to create an opposing pressure wave that stiffens the air within the flow passage to prevent the combustion wave from channeling fluid into air plenum and to push unburnt air back into the combustion chamber, resulting in a stronger combustion.

An exemplary technical effect of the systems and methods described herein includes at least one of: (a) preserving the kinetic energy of high velocity RDC combustion products; and (b) increasing the efficiency of each RDC by both improving fuel and air mixing and by preventing inhalation of combustion products into the air plenum.

Exemplary embodiments of RDC systems are provided herein. The systems and methods are not limited to the specific embodiments described herein, but rather, components of systems and/or steps of the methods may be utilized independently and separately from other components and/or steps described herein. For example, the configuration of components described herein may also be used in combination with other processes, and is not limited to practice with only ground-based, combined cycle power generation systems, as described herein. Rather, the exemplary embodiment can be implemented and utilized in connection with many applications where a RDC system may be implemented.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotating detonation combustor comprising:
    a combustion chamber configured for a rotating detonation process to produce a flow of combustion gas;
    an air plenum configured to contain a volume of air;
    a flow passage coupled in flow communication between said combustion chamber and said air plenum and configured to channel an airflow from said air plenum, wherein said flow passage comprises a plurality of fuel mixing mechanisms, wherein said plurality of fuel mixing mechanisms comprise a plurality of corrugations, wherein said flow passage includes a first sidewall and an opposing second sidewall that define said flow passage therebetween, wherein said first sidewall comprises a first plurality of corrugations, wherein said second sidewall comprises a second plurality of corrugations, wherein said first plurality of corrugations is circumferentially offset with said second plurality of corrugations, and wherein said flow passage defines a uniform width between said first plurality of corrugations and said second plurality of corrugations; and
    a fuel inlet coupled in flow communication with said flow passage and configured to channel a fuel flow into said flow passage, wherein said plurality of fuel mixing mechanisms are positioned downstream of said fuel inlet and are configured to mix said airflow and said fuel flow within said combustion chamber.

2. The rotating detonation combustor in accordance with claim 1, further comprising a throat portion defined between said air plenum and said flow passage, wherein said fuel inlet is positioned downstream of said throat portion, and wherein said plurality of fuel mixing mechanisms are positioned downstream from said fuel inlet.

3. The rotating detonation combustor in accordance with claim 1, wherein said air plenum comprises a pair of converging sidewalls and an end wall coupled between said sidewalls.

4. The rotating detonation combustor in accordance with claim 3, wherein said end wall is curved between said sidewalls.

5. The rotating detonation combustor in accordance with claim 1, wherein said first plurality of corrugations comprise a first plurality of peaks and a first plurality of troughs that alternate with said first plurality of troughs, wherein said second plurality of corrugations comprise a second plurality of peaks and a second plurality of troughs that alternate with said second plurality of troughs, and wherein said first plurality of troughs are radially aligned with said second plurality of peaks.

6. The rotating detonation combustor in accordance with claim 1, further comprising a combustor centerline extending through said air plenum, said flow passage, and said combustion chamber, wherein said air plenum comprises:
    a pair of converging sidewalls that are both obliquely oriented with respect to said combustor centerline such that said sidewalls taper towards said flow passage;
    an end wall coupled between said sidewalls wherein said end wall is curved between said sidewalls; and
    an air inlet positioned between said end wall and said flow passage and oriented perpendicular to said combustor centerline.

7. The rotating detonation combustor in accordance with claim 6, wherein said plenum is configured to create an opposing pressure wave that stiffens the air within said flow passage to prevent a combustion wave from channeling fluid into said air plenum and configured to push unburnt air back into said combustion chamber.

8. A turbine engine assembly comprising:
    a plurality of rotating detonation combustors, wherein each rotating detonation combustor comprises:
        a combustion chamber configured for a rotating detonation process to produce a flow of combustion gas;
        an air plenum configured to contain a volume of air;
        a flow passage coupled in flow communication between said combustion chamber and said air plenum and configured to channel an airflow from said air plenum, wherein said flow passage comprises a plurality of fuel mixing mechanisms, wherein said plurality of fuel mixing mechanisms comprise a plurality of corrugations, wherein said flow passage includes a first sidewall and an opposing second sidewall that define said flow passage therebetween, wherein said first sidewall comprises a first plurality of corrugations, and wherein said second sidewall comprises a second plurality of corrugations, wherein said first plurality of corrugations is circumferentially offset with said second plurality of corrugations, wherein said flow passage defines a uniform width between said first plurality of corrugations and said second plurality of corrugations;
        a fuel inlet coupled in flow communication with said flow passage and configured to channel a fuel flow into said flow passage, wherein said plurality of fuel mixing mechanisms are positioned downstream of said fuel inlet and are configured to mix said airflow and said fuel flow within said combustion chamber; and
    a turbine coupled downstream from said plurality of rotating detonation combustors, said turbine configured to receive the flow of combustion gas.

9. The turbine engine assembly in accordance with claim 8, wherein each rotating detonation combustor further comprises a centerline axis, wherein said air plenum is axially aligned with said combustion chamber, and wherein said flow passage is oriented parallel with said centerline axis.

10. A rotating detonation combustor comprising:
    a combustion chamber configured for a rotating detonation process to produce a flow of combustion gas;
    an air plenum configured to contain a volume of air;
    a flow passage coupled in flow communication between said combustion chamber and said air plenum and configured to channel an airflow from said air plenum, wherein said flow passage comprises a plurality of fuel mixing mechanisms, wherein said plurality of fuel mixing mechanisms comprise a plurality of corrugations formed in at least one sidewall of said flow passage;

a fuel inlet coupled in flow communication with said flow passage and configured to channel a fuel flow into said flow passage, wherein said plurality of fuel mixing mechanisms are positioned downstream of said fuel inlet and are configured to mix said airflow and said fuel flow within said combustion chamber; and a combustor centerline extending through said air plenum, said flow passage, and said combustion chamber, wherein said air plenum comprises:

a pair of converging sidewalls that are both obliquely oriented with respect to said combustor centerline such that said sidewalls taper towards said flow passage;

an end wall coupled between said sidewalls wherein said end wall is curved between said sidewalls; and an air inlet positioned between said end wall and said flow passage and oriented perpendicular to said combustor centerline.

11. The rotating detonation combustor in accordance with claim 10, wherein said plenum is configured to create an opposing pressure wave that stiffens the air within said flow passage to prevent a combustion wave from channeling fluid into said air plenum and configured to push unburnt air back into said combustion chamber.

* * * * *